(12) United States Patent
Woo et al.

(10) Patent No.: US 11,018,519 B2
(45) Date of Patent: May 25, 2021

(54) CHARGING APPARATUS CAPABLE OF REDUCING LOW FREQUENCY LEAKAGE CURRENT

(71) Applicants: HYUNDAI MOTOR COMPANY, Seoul (KR); KIA MOTORS CORPORATION, Seoul (KR)

(72) Inventors: Dong Gyun Woo, Suwon-si (KR); Gyu Tae Choi, Suwon-si (KR); Hui Sung Jang, Hwaseong-si (KR); Hyun Wook Seong, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 136 days.

(21) Appl. No.: 16/518,188

(22) Filed: Jul. 22, 2019

(65) Prior Publication Data
US 2020/0195037 A1 Jun. 18, 2020

(30) Foreign Application Priority Data

Dec. 12, 2018 (KR) .................. 10-2018-0160201

(51) Int. Cl.
*H02J 7/06* (2006.01)
*H02J 7/02* (2016.01)
(Continued)

(52) U.S. Cl.
CPC .............. *H02J 7/06* (2013.01); *B60L 53/14* (2019.02); *B60L 53/22* (2019.02); *B60L 53/62* (2019.02); *H02J 7/00* (2013.01); *H02J 7/022* (2013.01); *H02M 1/08* (2013.01); *H02M 1/4233* (2013.01); *B60L 2210/10* (2013.01); *B60L 2210/30* (2013.01); *H02J 2207/20* (2020.01)

(58) Field of Classification Search
CPC .. H02J 7/06; H02J 7/022; H02J 7/0052; H02J 2007/0059; H02M 1/4233; H02M 1/08; B60L 2210/10; B60L 53/22; B60L 53/62; B60L 2210/30; B60L 53/14
USPC ....................................................... 320/140
See application file for complete search history.

(56) References Cited

U.S. PATENT DOCUMENTS

| 6,930,293 B2 * | 8/2005 | Matsuo et al. ........... H05B 6/06 219/664 |
| 10,205,401 B1 | 2/2019 | Nikitin |

(Continued)

FOREIGN PATENT DOCUMENTS

| JP | 2010-119188 A | 5/2010 |
| JP | 2017-069996 A | 4/2017 |

(Continued)

*Primary Examiner* — Sun J Lin
(74) *Attorney, Agent, or Firm* — McDonnell Boehnen Hulbert & Berghoff LLP (57) ABSTRACT

Disclosed is a charging apparatus capable of reducing a low-frequency leakage current, the charging apparatus including a duty controller that determines a duty of a switching element in a power factor correction converter based on a level of a common-mode component of an alternating-current (AC) voltage of AC power provided from an external charging facility, a level of a direct-current (DC) voltage formed by a DC link capacitor, and a leakage current flowing from a connection node of two input-terminal Y-capacitors and a connection node of two output-terminal Y-capacitors to the ground.

6 Claims, 5 Drawing Sheets

(51) Int. Cl.
*H02M 1/42* (2007.01)
*H02J 7/00* (2006.01)
*H02M 1/08* (2006.01)
*B60L 53/14* (2019.01)
*B60L 53/22* (2019.01)
*B60L 53/62* (2019.01)

(56) References Cited

U.S. PATENT DOCUMENTS

| | | |
|---|---|---|
| 2006/0226707 A1 | 10/2006 | Mount et al. |
| 2007/0127275 A1 | 6/2007 | Chuang et al. |
| 2011/0149606 A1 | 6/2011 | Ho et al. |
| 2012/0194141 A1 | 8/2012 | Shi et al. |
| 2013/0249469 A1 | 9/2013 | Pahlevaninezhad et al. |
| 2014/0313795 A1 | 10/2014 | Mi et al. |
| 2014/0361628 A1 | 12/2014 | Huang et al. |
| 2018/0054140 A1 | 2/2018 | Chen et al. |
| 2019/0006952 A1 | 1/2019 | Takahara et al. |
| 2019/0291585 A1 | 9/2019 | Yang et al. |
| 2019/0341847 A1 | 11/2019 | Yuzurihara et al. |

FOREIGN PATENT DOCUMENTS

| | | |
|---|---|---|
| JP | 2017-163764 A | 9/2017 |
| KR | 10-2014-0114175 A | 9/2014 |
| KR | 10-2016-0013551 A | 2/2016 |

\* cited by examiner

| condition | | feedforward compensation gain |
|---|---|---|
| $i_{CG\_avg} - i_{CG\_avg}'$ | $k' - k''$ | $k$ |
| 0 | – | $k'$ |
| (+) | (+) | $k' - \Delta$ |
|  | (–) | $k' + \Delta$ |
| (–) | (+) | $k' + \Delta$ |
|  | (–) | $k' - \Delta$ |

FIG. 7

CHARGING APPARATUS CAPABLE OF REDUCING LOW FREQUENCY LEAKAGE CURRENT

CROSS REFERENCE TO RELATED APPLICATION

The present application claims priority to Korean Patent Application No. 10-2018-0160201, filed Dec. 12, 2018, the entire contents of which is incorporated herein for all purposes by this reference.

BACKGROUND

1. Field

The present disclosure relates to a charging apparatus for charging an energy storage device, and more particularly to a charging apparatus capable of reducing low-frequency leakage current that arises from a Y-capacitor provided at input/output terminals of the charging apparatus due to a common-mode component included in alternating-current (AC) system power.

2. Description of the Prior Art

Generally, electric cars or plug-in hybrid cars include an energy storage device (for example, a battery) that is supplied with alternating-current (AC) system power using a charging facility and stores the power. To charge an energy storage device, a vehicle includes a charging apparatus that converts AC system power, supplied from an external charging facility, into a desired level of direct-current (DC) power.

A charging apparatus installed in a vehicle is generally called an on-board charger (OBC) and includes a power factor correction converter to generate a DC voltage by correcting the power factor of inputted AC power and a DC-DC converter to convert the level of a voltage output from the power factor correction converter into a voltage level required for battery charging. Also, Y-capacitors are provided at input and output terminals of the in-vehicle charging apparatus to eliminate noise components. Generally, a Y-capacitor installed at the output terminal is manufactured to have higher capacitance than that of a Y-capacitor installed at the input terminal.

AC power provided by a charging facility outside a vehicle may be symmetric or asymmetric depending on the charging equipment type or the power supply network type of each country. In asymmetric AC power, a common-mode component exists. This common-mode component acts as a source of low-frequency (frequency of system power) noise.

In particular, when a DC-DC converter included in an in-vehicle charging apparatus is an insulated type having a transformer, an input terminal and an output terminal of the DC-DC converter are isolated from each other, and thus a Y-capacitor at the output terminal is not affected by system power input to the in-vehicle charging apparatus. However, when a non-insulated DC-DC converter is included in an in-vehicle charging apparatus, an electrical connection path is formed between input and output terminals of the DC-DC converter, and thus a common-mode component of input system power acts as low-frequency (the default frequency of system power) noise, thus creating a leakage current that flows to the ground through an output-terminal Y-capacitor having high capacitance. Although insignificant, a low-frequency leakage current also arises from an input-terminal Y-capacitor.

An external charging facility that supplies system power for a vehicle includes a residual current detection (RCD) device that cuts off supplied system power for safety if the amount of a leakage current exceeds a certain level. The level of low-frequency leakage current arising from an input-terminal Y-capacitor is considerable compared to a reference leakage current level used by the RDC device to determine whether to cut off system power.

Therefore, not only a low-frequency leakage current due to an output-terminal Y-capacitor but also a low-frequency leakage current due to an input-terminal Y-capacitor needs to be appropriately managed in order to prevent interruption of charging by the RDC device during charging.

Details mentioned in the description of the prior art are only for the purpose of improving understanding of the background of the present disclosure and should not be construed as corresponding to the prior art already known to those skilled in the art.

SUMMARY

An aspect of the present disclosure is to provide a charging apparatus capable of reducing a low-frequency leakage current that arises from a Y-capacitor provided at input/output terminals of the charging apparatus due to a common-mode component included in alternating current (AC) system power.

To solve the above-mentioned problems, the present disclosure provides a charging apparatus capable of reducing a low-frequency leakage current, the charging apparatus including: a filter that includes two input-terminal Y-capacitors, which are connected in series to input terminals, to which alternating-current (AC) power provided from an external charging facility is input, and a connection node of which is grounded; a power factor correction converter that includes a switching element, corrects the power factor of the AC power, provided from the external charging facility through the filter, through on/off control of the switching element to convert the AC power into direct-current (DC) power, and outputs the DC power; a DC link capacitor that is connected to both ends of the power factor correction converter and forms a DC voltage; a non-insulating DC-DC converter that converts the level of the DC voltage formed by the DC link capacitor into a voltage level required by an energy storage device to be charged; two output-terminal Y-capacitors which are connected to an output terminal of the DC-DC converter and are connected to each other in series and a connection node of which is grounded; and a duty controller that determines the duty of the switching element in the power factor correction converter on the basis of the level of a common-mode component of an AC voltage of the AC power provided from the external charging facility, the level of the DC voltage formed by the DC link capacitor, and a leakage current flowing from the connection node of the input-terminal Y-capacitors and the connection node of the output-terminal Y-capacitors to the ground.

According to one exemplary embodiment of the present disclosure, the duty controller may calculate the common-mode component of the AC voltage of the AC power using the equation below:

$$v_{g\_CM} = 0.5[v_{Y\text{-}Cap\_in} + \{-(v_g - v_{Y\text{-}Cap\_in})\}] = v_{Y\text{-}Cap\_in} - 0.5v_g,$$

where $v_{g\_CM}$ denotes the common-mode component of the AC voltage of the AC power, $v_{Y\text{-}Cap\_in}$ denotes a voltage value applied to one of the input-terminal Y-capacitors, and $v_g$ denotes the AC voltage of the AC power.

According to one exemplary embodiment of the present disclosure, the duty controller may include: a default duty generator that determines a first duty value for controlling the switching element such that the power factor correction converter outputs a preset level of voltage; a minimum leakage current adaptation controller that calculates a gain for compensating for a level of the AC voltage of the AC power and outputs the gain at preset time intervals, the minimum leakage current adaptation controller receiving an average value of the leakage current flowing from the connection node of the input-terminal Y-capacitors and the connection node of the output-terminal Y-capacitors to the ground at the preset time intervals, and determining and outputting a currently output gain according to a change in the average value of the leakage current previously input and a change in the gain; a multiplier that outputs the level of the common-mode component of the AC voltage of the AC power, multiplied by the gain output from the minimum leakage current adaptation controller; and a divider that generates a common-mode compensation duty value by dividing the output value from the multiplier by the level of the DC voltage formed by the DC link capacitor, and may provide a value equal to the common-mode compensation duty value plus each of the first duty value and a value complementary to the first duty value as a duty value for on/off control of the switching element.

According to one exemplary embodiment of the present disclosure, the minimum leakage current adaptation controller may: compare a currently input average leakage current value with a most recently input average leakage current value and compares a most recently calculated gain with a gain calculated immediately before the most recently calculated gain at the preset time intervals; output a value equal to the most recently calculated gain minus a preset gain variation Δ as a current gain when the currently input average leakage current value is greater than the most recently input average leakage current value and the most recently calculated gain is greater than the gain calculated immediately before the most recently calculated gain; output a value equal to the most recently calculated gain plus the preset gain variation Δ as a current gain when the currently input average leakage current value is greater than the most recently input average leakage current value and the most recently calculated gain is less than the gain calculated immediately before the most recently calculated gain; output a value equal to the most recently calculated gain k' plus a preset gain variation Δ as a current gain when the currently input average leakage current value is less than the most recently input average leakage current value and the most recently calculated gain is greater than the gain calculated immediately before the most recently calculated gain; and output a value equal to the most recently calculated gain minus the preset gain variation Δ as a current gain when the currently input average leakage current value is less than the most recently input average leakage current value and the most recently calculated gain is less than the gain calculated immediately before the most recently calculated gain.

According to one exemplary embodiment of the present disclosure, the power factor correction converter may include a first leg, including a first switching element and a second switching element, which are directly connected to each other, and a second leg, including a third switching element and a fourth switching element, which are directly connected to each other, the first leg and the second leg may be connected in parallel to two input ports of input terminals of the DC-DC converter, a connection node of the first switching element and the second switching element may be connected to one terminal of the input terminals to which the AC power is provided, and a connection node of the third switching element and the fourth switching element may be connected to another terminal of the input terminals to which the AC power is provided.

According to one exemplary embodiment of the present disclosure, the duty controller may provide a value equal to the first duty value plus the common-mode compensation duty value as a duty value for on/off control of the first switching element, may provide a value complementary to the value equal to the first duty value plus the common-mode compensation duty value as a duty value for on/off control of the second switching element, may provide a value equal to a value complementary to the first duty value plus the common-mode compensation duty value as a duty value for on/off control of the third switching element, and may provide a value complementary to the value equal to the value complementary to the first duty value plus the common-mode compensation duty value as a duty value for on/off control of the fourth switching element.

The charging apparatus capable of reducing the low-frequency leakage current can reduce a low-frequency leakage current due to a common-mode component of a DC power source having an asymmetric structure, which arises in the charging apparatus.

Particularly, the charging apparatus capable of reducing the low-frequency leakage current can reduce not only a low-frequency leakage current due to an output-terminal Y-capacitor having high capacitance but also a low-frequency leakage current due to an input-terminal Y-capacitor having low capacitance.

Accordingly, the charging apparatus capable of reducing the low-frequency leakage current can reduce a leakage current to lower than the level detected by a residual current detection (RCD) device provided in a charging facility, thereby preventing an interruption to charging.

The effects obtainable from the present disclosure are not limited to the effects mentioned above, and other effects not mentioned will be clearly understood by those skilled in the art from the following description.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, a charging apparatus capable of reducing a low-frequency leakage current according to various exemplary embodiments will be described in detail with reference to the accompanying drawings.

Figure 1:
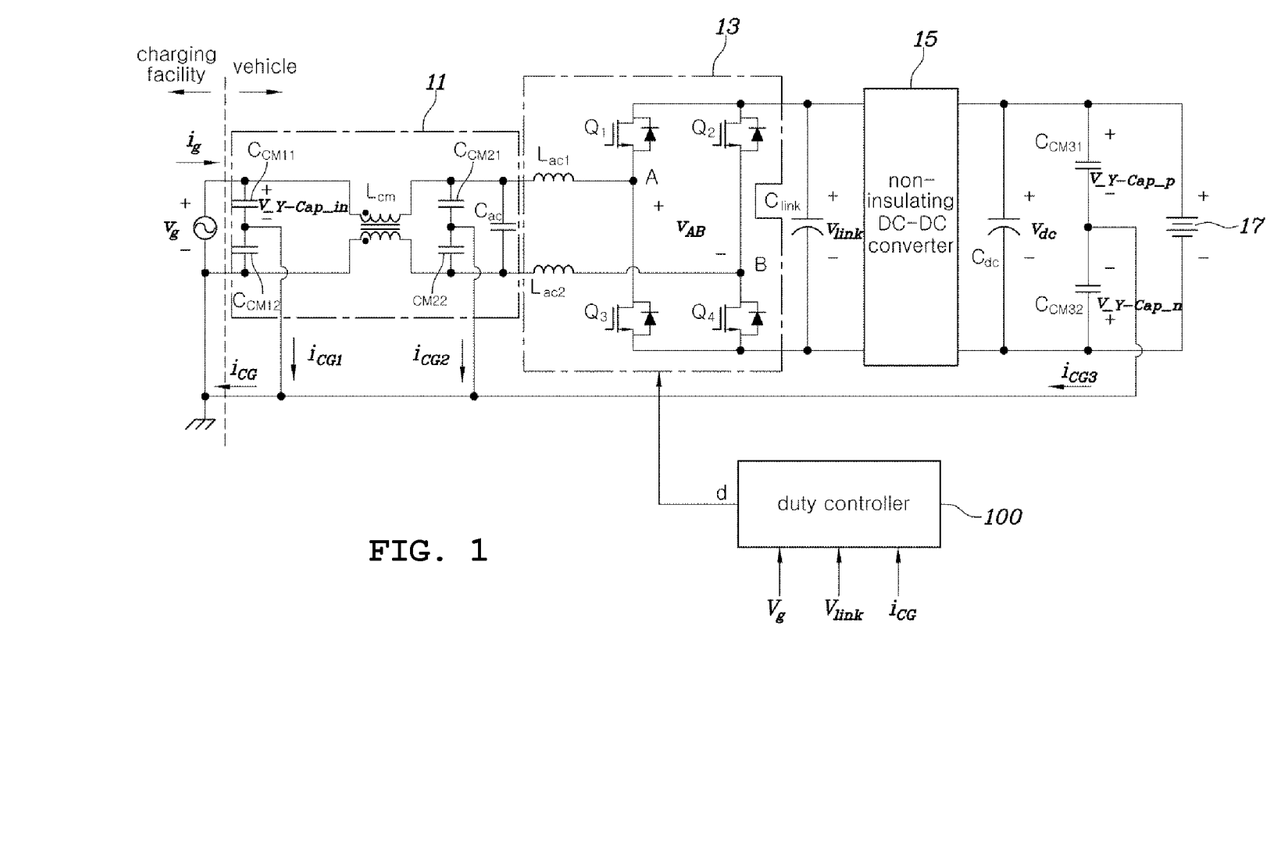
FIG. 1 is a circuit diagram illustrating a charging apparatus capable of reducing a low-frequency leakage current according to an exemplary embodiment of the present disclosure.

FIG. 1 is a circuit diagram illustrating a charging apparatus capable of reducing a low-frequency leakage current according to an exemplary embodiment of the present disclosure.

Referring to FIG. 1, the charging apparatus capable of reducing the low-frequency leakage current according to the exemplary embodiment of the present disclosure may include a filter 11 to eliminate high-frequency noise of AC power ($v_g$, $i_g$) input from an external charging facility, a power factor correction (PFC) converter 13, a DC link capacitor $C_{link}$ to form a DC voltage at an output terminal of the PFC converter 13, a DC-DC converter 15 to convert the level of the voltage $V_{link}$ of the DC link capacitor $C_{link}$ into a charging voltage level for charging a battery 17, output-terminal Y-capacitors $C_{CM31}$ and $C_{CM32}$ connected to an output terminal of the DC-DC converter 15, and a duty controller 100.

The filter 11 is an element for eliminating a high-frequency noise component included in power provided from an external charging facility, and may include two Y-capacitors $C_{CM11}$ and $C_{CM12}$ connected in series to an input terminal to which an AC voltage from the external charging facility is applied. A connection node of the two Y-capacitors $C_{CM11}$ and $C_{CM12}$ may be grounded.

In FIG. 1, the filter 11 may include two inductors $L_{CM}$ forming a transformer and additional input-terminal Y-capacitors $C_{CM21}$ and $C_{CM22}$ connected to the two inductors $L_{CM}$, but this structure may be changed as necessary. A connection node of the additional input-terminal Y-capacitors $C_{CM21}$ and $C_{CM22}$ may also be grounded.

Leakage currents $i_{CG1}$ and $i_{CG2}$ due to a common-mode component of the input AC power may occur at the connection node of the two input-terminal Y-capacitors $C_{CM11}$ and $C_{CM12}$ and the connection node of the two input-terminal Y-capacitors $C_{CM21}$ and $C_{CM22}$ in the filter 11.

The PFC converter 13 receives AC power (system power) $v_g$ inputted from the outside, converts the AC power into DC power, and outputs the DC power. Here, the PFC converter 13 corrects the power factor of the AC power. In particular, the PFC converter 13 may be configured using a grid-connected inverter topology having a plurality of switching elements $Q_1$ to $Q_4$.

More specifically, the PFC converter 13 adopting the grid-connected inverter topology may include a first leg including a first switching element $Q_1$ and a second switching element $Q_2$ directly coupled to each other and a second leg including a third switching element $Q_3$ and a fourth switching element $Q_4$ directly coupled to each other. The first leg and the second leg may be connected in parallel to two input ports of input terminals of the DC-DC converter 15. That is, the first switching element $Q_1$ and the second switching element $Q_2$ may be sequentially connected in series between a positive (+) terminal and a negative (−) terminal of the output terminal of the PFC converter 13, and the third switching element $Q_3$ and the fourth switching element $Q_4$ may be sequentially connected in series between the positive (+) terminal and the negative (−) terminal of the output terminal of the PFC converter 13.

Further, the PFC converter 13 may include a first inductor $L_{ac1}$ respective ends of which are connected to one end of the input AC power or the filter 11 and to a connection node of the first switching element $Q_1$ and the second switching element $Q_2$, and a second inductor $L_{ac2}$, respective ends of which are connected to the other end of the input AC power and a connection node of the third switching element $Q_3$ and the fourth switching element $Q_4$.

The on/off states of the switching elements $Q_1$ to $Q_4$ of the PFC converter 13 may be controlled according to a duty value determined by the duty controller 100 to be described later.

AC power filtered by the filter 11 may be input to an input terminal of the PFC converter 13. AC power may have a symmetric or asymmetric structure depending on the country or the specification of a charging facility. AC power provided in the symmetrical structure has no common-mode component, but single-phase AC power provided in the asymmetric structure may be variously changed depending on the form or the provided structure thereof.

The PFC converter 13 converts AC power input from an AC power source into DC power by correcting the power factor of the AC power and outputs the DC power. A DC link capacitor $C_{link}$ having both ends connected to respective ports of the output terminal of the PFC converter 13 is charged with power output from the PFC converter 13 to form a certain level of DC link voltage $v_{link}$.

The non-insulating DC-DC converter 15 may convert the DC voltage vin of the DC link capacitor $C_{link}$ connected to both output terminals of the PFC converter 13 into a desired level of DC voltage and may output the DC voltage. Since various exemplary embodiments of the present disclosure relate to a charging apparatus that generates DC power for charging the battery 17 of a vehicle or the like, the non-insulating DC-DC converter 15 may be controlled to output a level of voltage to charge the battery 17.

The non-insulating DC-DC converter applied to various exemplary embodiments of the present disclosure may employ diverse structures known in the art, and a method for controlling the DC-DC converter is also known in the art. Therefore, an additional description of the DC-DC converter 15 will be omitted.

Output-terminal Y-capacitors $C_{CM31}$ and $C_{CM32}$ are connected to output terminals of the non-insulating DC-DC converter 15, and a connection node of the two output-terminal Y-capacitors $C_{CM31}$ and $C_{CM32}$ is grounded. Specifically, one ends of first and second output-terminal Y-capacitors $C_{CM31}$ and $C_{CM32}$ may be respectively connected to a positive (+) terminal and a negative (−) terminal of the output terminals of the DC-DC converter 15 (that is, an output terminal of the charging apparatus), and the other ends thereof may be commonly connected to the ground (chassis ground in a vehicle).

Generally, since the first and second output-terminal Y-capacitors $C_{CM31}$ and $C_{CM32}$ provided at the output terminal of the charging apparatus have much greater capacitance than the input-terminal Y-capacitors $C_{CM11}$, $C_{CM12}$, $C_{CM21}$, and $C_{CM22}$ included in the filter 11 of the charging apparatus, a leakage current $i_{CG3}$, which occupies a large portion of a low-frequency leakage current $i_{CG}$ due to a common-mode component, flows out to the ground through the output-terminal Y-capacitors $C_{CM31}$ and $C_{CM32}$.

Various exemplary embodiments of the present disclosure provide a method for appropriately controlling the duty of a switching element in the PFC converter 13 to reduce the overall leakage current sensed by an RDC considering not only the low-frequency leakage current $i_{CG3}$ from the output-terminal Y-capacitors $C_{CM31}$ and $C_{CM32}$, which occurs due to the common-mode component of the input system power, but also the low-frequency leakage currents $i_{CG1}$ and $i_{CG2}$ (fundamental-wave components of the leakage currents) from the input-terminal Y-capacitors $C_{CM11}$, $C_{CM12}$, $C_{CM21}$, and $C_{CM22}$.

Figure 2:
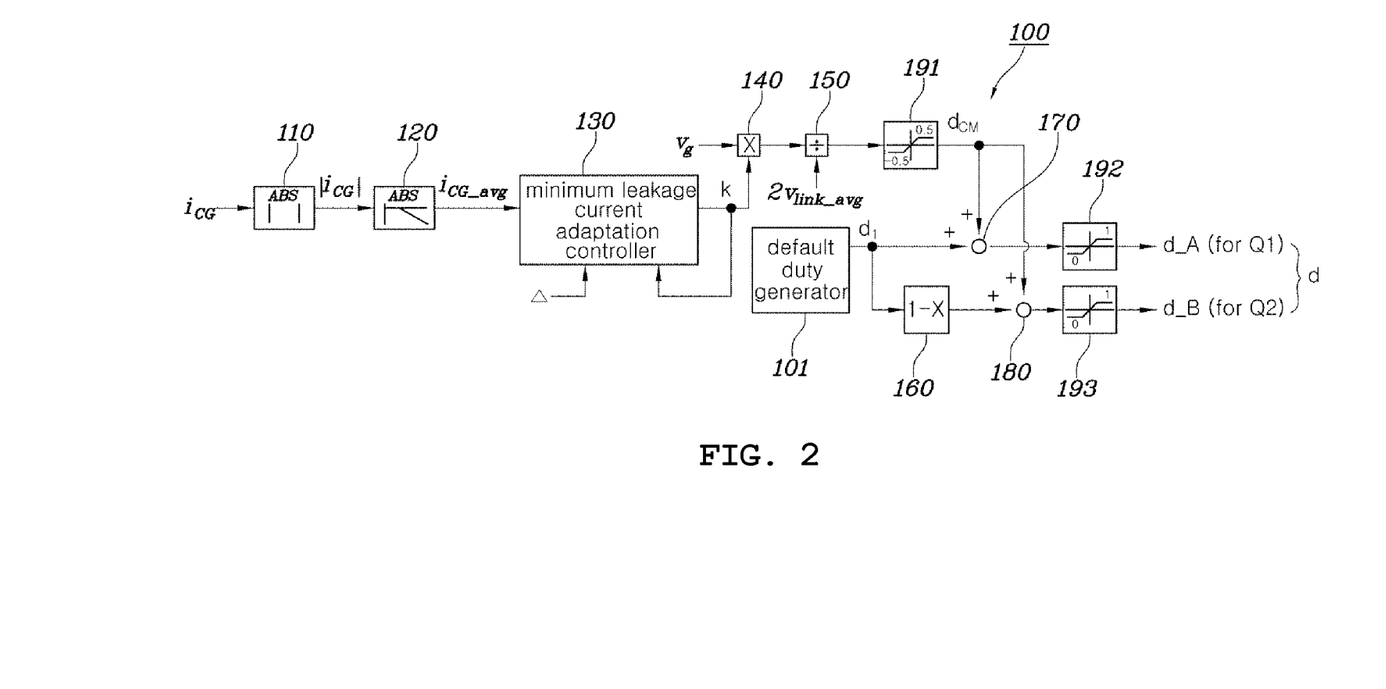
FIG. 2 is a block diagram illustrating an example of a duty controller of a charging apparatus capable of reducing a low-frequency leakage current in more detail according to an exemplary embodiment of the present disclosure.

FIG. 2 is a block diagram illustrating in more detail an example of a duty controller of a charging apparatus capable of reducing a low-frequency leakage current according to an exemplary embodiment of the present disclosure.

The duty controller 100 may include a default duty generator 110 to determine a first duty value $d_1$ of the switching elements $Q_1$ to $Q_4$ in the PFC converter 13 such that the PFC converter 13 outputs a preset level of voltage and a divider 150 to generate a common-mode compensation duty $d_{CM}$ by dividing a common-mode component $v_{g\_CM}$ of a system AC voltage $v_g$ by the level of a DC link voltage $v_{link}$.

The default duty generator 101 in the duty controller 100 may determine and output the duty value $d_1$ for controlling the switching elements $Q_1$ to $Q_4$ such that the PFC converter 13 outputs the preset level of voltage. That is, the default duty generator 101 may determine the first duty value $d_1$ of the switching elements $Q_1$ to $Q_4$ in the PFC converter 13 such that the level of the DC link voltage $v_{link}$ can be the preset level of voltage.

Specifically, the default duty generator 101 may generate a reference current value for the DC link voltage $V_{link}$ to follow the preset voltage by comparing the DC link voltage $V_{link}$ with the preset voltage, may generate a dq-axis voltage control value for an input current to follow the reference current value by comparing a value obtained by dq transformation of the input current with the reference current value on the basis of phase information on an input voltage, and may then generate the first duty value $d_1$ by inverse dq transformation of the dq-axis voltage control value. Since a method by which the default duty generator 101 generates the first duty value $d_1$ is a known technique applied to a PFC control structure using an inverter-type topology, a detailed description thereof will be omitted.

The divider 150 performs an operation of dividing the common-mode component $v_{g\_CM}$ of the system AC voltage $v_g$ by the level of the DC link voltage $v_{link}$ and may generate the common-mode compensation duty $d_{CM}$ for controlling the switching elements $Q_1$ to $Q_4$ of the PFC converter 13 so that output from the divider 150 compensates for current leakage due to the output-terminal Y-capacitors $C_{CM31}$ and $C_{CM32}$.

Figure 3:
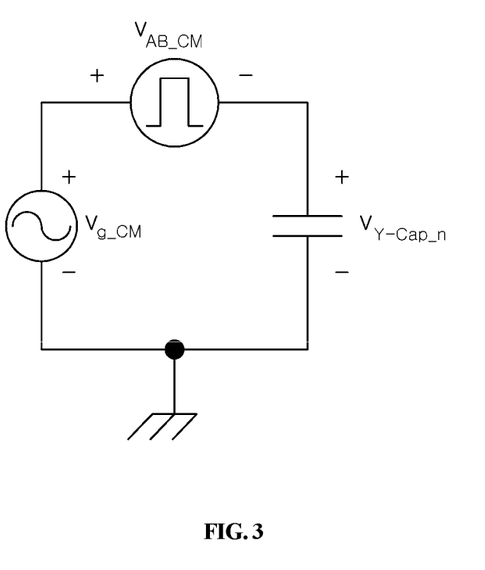
FIG. 3 is an equivalent circuit diagram illustrating a connection relationship between a common-mode component and a Y-capacitor of a charging apparatus capable of reducing a low-frequency leakage current according to an exemplary embodiment of the present disclosure.

FIG. 3 is an equivalent circuit diagram illustrating a connection relationship between a common-mode component and a Y-capacitor of a charging apparatus capable of reducing a low-frequency leakage current according to an exemplary embodiment of the present disclosure.

In FIG. 3, a voltage indicated by $v_{AB\_CM}$ is a common-mode component of a voltage $v_{AB}$ formed between the connection node A of the first switching element $Q_1$ and the second switching element $Q_2$, which constitute the first leg of the PFC converter 13, and the connection node B of the third switching element $Q_3$ and the fourth switching element $Q_4$, which constitute the second leg.

The equivalent circuit diagram illustrated in FIG. 3 is an equivalent circuit diagram configured in consideration only of a portion related to the low-frequency common-mode component described in the circuit of FIG. 1. In the circuit of FIG. 1, the inductors $L_{ac}$ have insignificant impedance with respect to a low-frequency component and thus may be disregarded. The non-insulating DC-DC converter 15 transmits the low-frequency common-mode component to the output terminal and thus may be disregarded. Further, since it is easy to analyze the output-terminal Y-capacitors on the basis of a negative (−) DC line in analyzing the equivalent circuit, it is appropriate to express a low-frequency common-mode path through the second Y-capacitor $C_{CM32}$. Considering these aspects in FIG. 1, an equivalent circuit diagram related to the common-mode component may be derived as shown in FIG. 3.

As illustrated in FIG. 3, when the common-mode component $v_{AB\_CM}$ of the voltage between the node A and the node B is controlled, it is possible to adjust a leakage current due to a common-mode component $v_{g\_CM}$ of an AC power source flowing in a Y-capacitor (the second Y-capacitor $C_{CM32}$ in FIG. 2). Here, the voltage between the node A and the node B may be determined by controlling the on/off duty value of the switching elements $Q_1$ to $Q_4$ using a grid-connected inverter topology.

That is, in order to reduce the low-frequency leakage current of the Y-capacitors $C_{CM31}$ and $C_{CM32}$ due to the common-mode component of the AC power source, the on/off duty value of the switching elements $Q_1$ to $Q_4$ is controlled so that the common-mode component $v_{g\_CM}$ of the AC power source is offset by the common-mode component $v_{AB\_CM}$ of the voltage between the node A and the node B. That is, the on/off duty value of the switching elements $Q_1$ to $Q_4$ is determined such that the voltage of the Y-capacitors $C_{CM31}$ and $C_{CM32}$ is converted into DC.

Since the Y-capacitors $C_{CM31}$ and $C_{CM32}$ have substantially infinite impedance with respect to a DC component, the DC component of the current $i_{CG}$ flowing out to the ground through the Y-capacitors $C_{CM31}$ and $C_{CM32}$ can be disregarded.

Therefore, a DC component of the common-mode component voltage $v_{AB\_CM}$ between the node A and the node B shown in FIG. 3 may be disregarded, and only an AC component may be controlled to be the same as the common-mode component $v_{g\_CM}$ of the system power source, thereby eliminating the low-frequency leakage current due to the common-mode component.

To this end, in one exemplary embodiment of the present disclosure, a second duty value $d_{CM}$ may be generated by dividing the common-mode component $v_{g\_CM}$ of the AC voltage $v_g$ of the AC power by the DC link voltage $v_{link}$, and may be added to the first duty value $d_1$, thereby controlling the switching elements $Q_1$ to $Q_4$ of the PFC converter 13.

$$v_{Y\text{-}cap\_p} = v_{bat} - \alpha v_{link} \qquad \text{[Equation 1]}$$

In this equation, $v_{Y\text{-}cap\_p}$ denotes the voltage of the Y-capacitor $C_{CM31}$ connected to the positive (+) terminal of the output terminal of the DC-DC converter 15, $v_{bat}$ denotes the voltage of an energy storage device connected to the output terminal of the DC-DC converter 15, and $v_{link}$ denotes the DC link voltage of the input terminal of the DC-DC converter 15. Further, $\alpha$ is a constant determined to range from 0 to 1, which may preferably be a value close to 0.5, and more preferably 0.5.

According to this equation, the voltage of the Y-capacitor $C_{CM32}$ connected to the negative (−) terminal of the output terminal of the DC-DC converter 15 always has a level of $-\alpha v_{link}$.

The DC component of the common-mode component voltage $v_{AB\_CM}$ between the node A and the node B is half ($0.5 v_{link}$) of the DC link voltage $v_{link}$, and the voltage of the Y-capacitor $C_{CM32}$ always has a level of $-\alpha v_{link}$ according to Equation 1. That is, considering FIG. 3 and Equation 1, regardless of whether the voltage of the DC-DC converter 15 is boosted or dropped, if α=0.5, it is possible to generate the second duty value $d_{CM}$ for eliminating the common-mode component by adjusting only the AC component of the common-mode component voltage $v_{AB\_CM}$ between the node A and the node B without considering the DC component.

Since the voltage of each of the nodes A and B is determined by the switching element duty ($d_A$ and $d_B$) of each leg ($V_A = d_A V_{link}$, $V_B = d_B V_{link}$), the common-mode component voltage $v_{AB\_CM}$ between the node A and the node B may be determined according to Equation 2.

$$V_{AB\_CM} = 0.5(V_A + V_B) = 0.5(d_A + d_B) V_{link} \quad \text{[Equation 2]}$$

Further, referring to the equivalent circuit in FIG. 3, when the common-mode component voltage of the AC power is equal to the sum of the common-mode component voltage $v_{AB\_CM}$ between the node A and the node B and the voltage of the Y-capacitor $C_{CM32}$, the leakage current can be eliminated. Therefore, since a DC offset component may not be considered, particularly when the voltage of the Y-capacitor $C_{CM32}$ is $-0.5v_{link}$, Equation 3 can be derived.

$$V_{g\_CM} = V_{AB\_CM} + V_{Y\text{-}cap\_n} = 0.5(d_A + d_B) V_{link} - 0.5 V_{link} \quad \text{[Equation 3]}$$

The switching element duty ($d_A$ and $d_B$) of each leg is determined on the basis of a duty determined to have a value complementary to 0.5 and thus includes an offset value of 0.5. That is, since the sum of duties for controlling the switching elements of each leg is determined to always be 1 by the first duty $d_1$ generated by the default duty generator 101, which is a default duty for generating the switching element duty ($d_A$ and $d_B$) of each leg, the duty $d_{CM}$ corresponding to the common-mode component can be obtained by subtracting 0.5 from the value obtained by dividing the sum of the switching element duties ($d_A$ and $d_B$) of each leg generated on the basis of the default duty by 0.5, which is represented by Equation 4.

$$d_{CM} = 0.5(d_A + d_B) - 0.5 \quad \text{[Equation 4]}$$

According to Equation 3 and Equation 4, the duty corresponding to the common-mode component can be obtained using Equation 5.

$$d_{CM} = \frac{V_{g\_CM}}{V_{link}} \quad \text{[Equation 5]}$$

That is, the common-mode component $v_{g\_CM}$ of the AC voltage $v_g$ is divided by the voltage of a DC link terminal connecting the PFC converter 13 and the DC-DC converter 15, thereby deriving the duty for controlling the common-mode component.

Here, the common common-mode component $v_{g\_CM}$ of the AC voltage $v_g$ may be theoretically determined by detecting an input voltage according to the type of AC power. The method for determining a common-mode component of an AC voltage according to the type of AC power supply will be described with reference to FIGS. 4 to 6.

Figure 4:
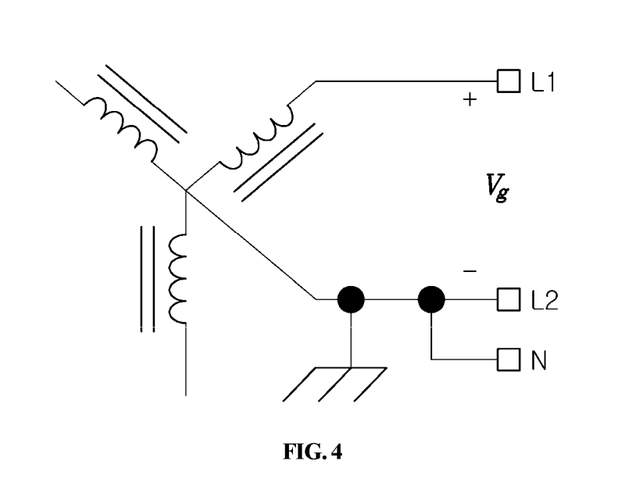
FIG. 4 illustrates a type of external charger AC system power supply structure.
Figure 5:
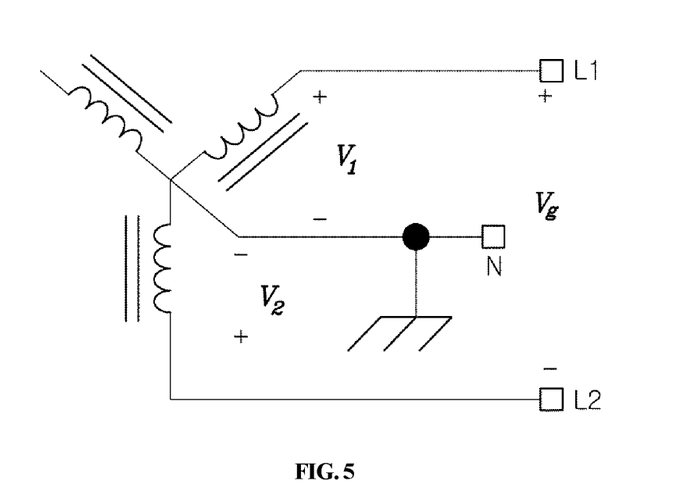
FIG. 5 illustrates another type of external charger AC system power supply structure.
Figure 6:
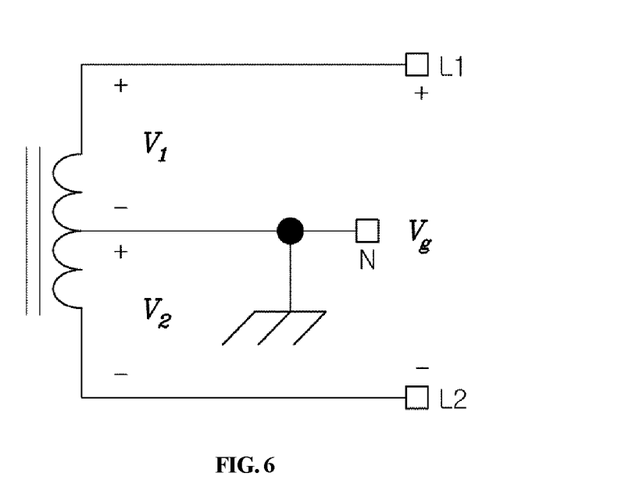
FIG. 6 illustrates another type of external charger AC system power supply structure.

FIGS. 4 to 6 illustrate various types of external charger AC system power supply structures.

FIG. 4 shows the AC power supply structure of an In-Cable Control Box (ICCB) employed in Korea, Europe, and North America, which is an asymmetric structure for supplying an AC voltage between one of three phases and a grounded neutral point. In the system power supply structure shown in FIG. 4, ½ of supplied AC power $v_g$ may be a common-mode component. Particularly, in the system structure of FIG. 4, when a connection line of two lines L1 and L2 and an input terminal of a vehicle-mounted charger is reversed, −½ of the AC power $v_g$ may be a common-mode component.

FIG. 5 shows one system structure employed in North America, which is an asymmetric structure in which a voltage between two lines having different phases is provided as an AC voltage $v_g$ and a neutral point between the two lines is grounded. In the structure shown in FIG. 5, a phase-angle difference between the two lines of +120 degrees or −120 degrees indicates different common-mode components.

FIG. 6 is a symmetric structure employed for Electric Vehicle Supply Equipment (EVSE) in North America. In this case, a common-mode component is zero.

In the system power supply structures shown in FIGS. 4 to 6, a common-mode voltage may be represented by the average, that is, ½, of voltages between each of the two terminals of the input terminal to which the AC voltage $v_g$ is input and the ground.

In particular, when detecting a voltage applied to one Y-capacitor $C_{CM11}$ in the presence of the Y-capacitors $C_{CM11}$ and $C_{CM12}$ connected to the input terminal of the filter 11, the common-mode component of the AC voltage may be defined by the following equation.

$$v_{g\_CM} = 0.5[v_{Y\text{-}Cap\_in} + \{-(v_g - v_{Y\text{-}Cap\_in})\}] = v_{Y\text{-}Cap\_in} - 0.5 v_g \quad \text{[Equation 6]}$$

Using Equation 6, the duty controller 100 may calculate and provide the common-mode component $v_{g\_CM}$ of the input AC voltage.

Referring again to FIG. 2, the duty controller 100 may include a complementary value calculator 160 to calculate a value obtained by subtracting the first duty value $d_1$ from the value complementary to the first duty value $d_1$ generated by the default duty generator 101, that is, 1, a first adder 170 to generate a duty $d_A$ for controlling the first switching element $Q_1$ of the PFC converter 13 by adding the first duty value $d_1$ and the common-mode compensation duty value $d_{CM}$, and a second adder 180 to generate a duty $d_B$ for controlling the second switching element $Q_2$ by adding the value output from the complementary value calculator 160 and the common-mode compensation duty value $d_{CM}$. Since the third switching element $Q_3$ included in the same leg as the first switching device element $Q_1$ is turned on/off in a complementary relationship with the first switching element $Q_1$, the third switching element $Q_3$ may be controlled with a duty of $1 - d_A$. Also, since the fourth switching element $Q_4$ included in the same leg as the second switching device element $Q_2$ is turned on/off in a complementary relationship with the second switching element $Q_2$, the fourth switching element $Q_4$ may be controlled with a duty of $1 - d_B$.

In addition, the duty controller 100 may include a plurality of limiters 191, 192, and 193 to limit an input value to a specific range. For example, a limiter 191 may limit the output value from the divider 150 to a value ranging from −0.5 to 0.5, another limiter 192 may limit the output value from the first adder 170 to a value ranging from 0 to 1, and another limiter 193 may limit the output value from the second adder 180 to a value ranging from 0 to 1. These limiters may be applied to required positions by properly and selectively adjusting upper and lower limits thereof.

In an exemplary embodiment of the present disclosure, the duty controller 100 may further include a minimum leakage current adaptation controller 130 that generates a feedforward compensation gain of the AC voltage $v_g$ of the system AC power before the division by the DC link voltage $v_{link}$ in the calculation of the common-mode compensation duty value $d_{CM}$ to adjust the duty of the PFC converter 13 in order to reduce a leakage current generated in the input-terminal Y-capacitors $C_{CM11}$, $C_{CM12}$, $C_{CM21}$, and $C_{CM22}$ of the filter 11.

The minimum leakage current adaptation controller 130 may provide an appropriate compensation gain k according to the change in the leakage current $i_{CG}$ flowing from the connection node of the two input-terminal Y-capacitors $C_{CM11}$ and $C_{CM12}$, the connection node of the two input-terminal Y-capacitors $C_{CM21}$ and $C_{CM22}$, and the connection node of the two output-terminal Y-capacitors $C_{CM31}$ and $C_{CM32}$ to the ground. The gain k is multiplied by the common-mode component $v_{g\_CM}$ of the AC voltage $v_g$ of the system AC power by a multiplier 140 before the division by the DC link voltage $v_{link}$ through the multiplier 140, thereby achieving feedforward compensation of the AC voltage $v_g$ of the system AC power.

More specifically, the minimum leakage current adaptation controller 130 calculates the gain k at preset time intervals. The minimum leakage current adaptation controller 130 may receive an average leakage current value $i_{CG\_avg}$ at preset time intervals and may determine and output a currently output gain according to a change in the average leakage current value, previously input, and a change in the gain.

Figure 7:
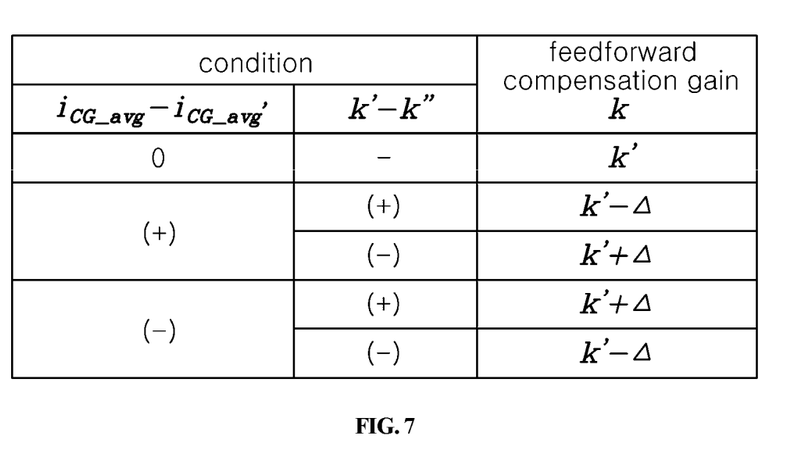
FIG. 7 is a table illustrating an operation in which a minimum leakage current adaptation controller in the duty controller shown in FIG. 2 determines a feedforward compensation gain.

FIG. 7 is a table illustrating an operation in which the minimum leakage current adaptation controller in the duty controller shown in FIG. 2 determines a feedforward compensation gain.

Referring to FIG. 7, the minimum leakage current adaptation controller 130 compares a currently input average leakage current value $i_{CG\_avg}$ with a most recently input average leakage current value $i_{CG\_avg}'$ and compares a most recently calculated gain k' with a gain k" calculated immediately before the most recently calculated gain k' at preset time intervals.

When the currently input average leakage current value $i_{CG\_avg}$ is the same as the most recently input average leakage current value $i_{CG\_avg}'$, the minimum leakage current adaptation controller 130 outputs the most recently calculated gain k' as the current gain.

In addition, when the currently input average leakage current value $i_{CG\_avg}$ is greater than the most recently input average leakage current value $i_{CG\_avg}'$ and the most recently calculated gain k' is greater than the gain k" calculated immediately before the most recently calculated gain k', the minimum leakage current adaptation controller 130 outputs a value equal to the most recently calculated gain k' minus a preset gain variation Δ as a current gain. When the currently input average leakage current value $i_{CG\_avg}$ is greater than the most recently input average leakage current value $i_{CG\_avg}'$ and the most recently calculated gain k' is less than the gain k" calculated immediately before the most recently calculated gain k', the minimum leakage current adaptation controller 130 outputs a value equal to the most recently calculated gain k' plus the preset gain variation Δ as a current gain.

Further, when the currently input average leakage current value $i_{CG\_avg}$ is less than the most recently input average leakage current value $i_{CG\_avg}'$ and the most recently calculated gain k' is greater than the gain k" calculated immediately before the most recently calculated gain k', the minimum leakage current adaptation controller 130 outputs a value equal to the most recently calculated gain k' plus a preset gain variation Δ as a current gain. When the currently input average leakage current value $i_{CG\_avg}$ is less than the most recently input average leakage current value $i_{CG\_avg}'$ and the most recently calculated gain k' is less than the gain k" calculated immediately before the most recently calculated gain k', the minimum leakage current adaptation controller 130 outputs a value equal to the most recently calculated gain k' minus the preset gain variation Δ as a current gain.

As described above, in one exemplary embodiment of the present disclosure, a common-mode compensation duty $d_{CM}$ may be calculated in consideration of a change in the leakage current arising at the connection node of the two input-terminal Y-capacitors $C_{CM11}$ and $C_{CM12}$, the connection node of the two input-terminal Y-capacitors $C_{CM21}$ and $C_{CM22}$, and the connection node of the two output-terminal Y-capacitors $C_{CM31}$ and $C_{CM32}$, which are disposed at the input/output sides of the charging apparatus, thereby eliminating fundamental-wave components of the leakage current that arise from a common-mode component of AC power and thus preventing interruption of charging by a residual current detection (RCD) device of an external charging facility.

In FIG. 2, reference numerals 110 and 120 indicate elements for generating an average leakage current value, wherein 110 indicates an element for calculating the absolute value of a leakage current $i_{CG}$, and 120 indicates a low-pass filter for generating an average leakage current value $i_{CG\_avg}$ by performing low-pass filtering of the absolute value of a leakage current.

While the present disclosure has been shown and described with reference to the specific exemplary embodiments, it will be apparent to those skilled in the art that various changes and modifications can be made to the present disclosure within the scope of the claims.

What is claimed is:

1. A charging apparatus capable of reducing a low-frequency leakage current, the charging apparatus comprising:
    a filter that comprises two input-terminal Y-capacitors which are connected in series to input terminals, to which alternating-current (AC) power provided from an external charging facility is input, and a connection node of which is grounded;
    a power factor correction converter that comprises a switching element, corrects a power factor of the AC power, provided from the external charging facility through the filter, through on/off control of the switching element to convert the AC power into direct-current (DC) power, and outputs the DC power;
    a DC link capacitor that is connected to both ends of the power factor correction converter and forms a DC voltage;
    a non-insulating DC-DC converter that converts a level of the DC voltage formed by the DC link capacitor into a voltage level required by an energy storage device to be charged;
    two output-terminal Y-capacitors which are connected to an output terminal of the DC-DC converter and are connected to each other in series and a connection node of which is grounded; and
    a duty controller that determines a duty of the switching element in the power factor correction converter based on a level of a common-mode component of an AC voltage of the AC power provided from the external charging facility, a level of the DC voltage formed by the DC link capacitor, and a leakage current flowing from the connection node of the two input-terminal Y-capacitors and the connection node of the two output-terminal Y-capacitors to a ground.

2. The charging apparatus of claim 1, wherein the duty controller calculates the common-mode component of the AC voltage of the AC power using an equation below:

$$v_{g\_CM} = 0.5[v_{Y\text{-}Cap\_in} + \{-(v_g - v_{Y\text{-}Cap\_in})\}] = v_{Y\text{-}Cap\_in} - 0.5 v_g,$$

where $v_{g\_CM}$ denotes the common-mode component of the AC voltage of the AC power, $v_{Y\text{-}Cap\_in}$ denotes a voltage value applied to one of the input-terminal Y-capacitors, and $v_g$ denotes the denotes the AC voltage of the AC power.

3. The charging apparatus of claim 1, wherein the duty controller comprises:
  a default duty generator that determines a first duty value for controlling the switching element such that the power factor correction converter outputs a preset level of voltage;
  a minimum leakage current adaptation controller that calculates a gain for compensating for a level of the AC voltage of the AC power and outputs the gain at preset time intervals, the minimum leakage current adaptation controller receiving an average value of the leakage current flowing from the connection node of the two input-terminal Y-capacitors and the connection node of the two output-terminal Y-capacitors to the ground at the preset time intervals, and determining and outputting a currently output gain according to a change in the average value of the leakage current, input in advance, and a change in the gain;
  a multiplier that outputs the level of the common-mode component of the AC voltage of the AC power multiplied by the gain output by the minimum leakage current adaptation controller; and
  a divider that generates a common-mode compensation duty value by dividing an output value from the multiplier by the level of the DC voltage formed by the DC link capacitor and provides a value equal to the common-mode compensation duty value plus each of the first duty value and a value complementary to the first duty value as a duty value for on/off control of the switching element.

4. The charging apparatus of claim 3, wherein the minimum leakage current adaptation controller:
  compares a currently input average leakage current value with a most recently input average leakage current value and compares a most recently calculated gain with a gain calculated immediately before the most recently calculated gain at the preset time intervals;
  outputs a value equal to the most recently calculated gain minus a preset gain variation $\Delta$ as a current gain when the currently input average leakage current value is greater than the most recently input average leakage current value and the most recently calculated gain is greater than the gain calculated immediately before the most recently calculated gain;
  outputs a value equal to the most recently calculated gain plus the preset gain variation $\Delta$ as a current gain when the currently input average leakage current value is greater than the most recently input average leakage current value and the most recently calculated gain is less than the gain calculated immediately before the most recently calculated gain;
  outputs a value equal to the most recently calculated gain plus a preset gain variation $\Delta$ as a current gain when the currently input average leakage current value is less than the most recently input average leakage current value and the most recently calculated gain is greater than the gain calculated immediately before the most recently calculated gain; and
  outputs a value equal to the most recently calculated gain minus the preset gain variation $\Delta$ as a current gain when the currently input average leakage current value is less than the most recently input average leakage current value and the most recently calculated gain is less than the gain calculated immediately before the most recently calculated gain.

5. The charging apparatus of claim 4, wherein the power factor correction converter comprises:
  a first leg comprising a first switching element and a second switching element which are directly connected to each other; and
  a second leg comprising a third switching element and a fourth switching element which are directly connected to each other,
  the first leg and the second leg are connected in parallel to two input ports of input terminals of the DC-DC converter,
  a connection node of the first switching element and the second switching element is connected to one terminal of the input terminals to which the AC power is provided, and
  a connection node of the third switching element and the fourth switching element is connected to another terminal of the input terminals to which the AC power is provided.

6. The charging apparatus of claim 5, wherein the duty controller provides a value equal to the first duty value plus the common-mode compensation duty value as a duty value for on/off control of the first switching element, provides a value complementary to the value equal to the first duty value plus the common-mode compensation duty value as a duty value for on/off control of the second switching element, provides a value equal to a value complementary to the first duty value plus the common-mode compensation duty value as a duty value for on/off control of the third switching element, and provides a value complementary to the value equal to the value complementary to the first duty value plus the common-mode compensation duty value as a duty value for on/off control of the fourth switching element.

* * * * *